US012627387B2

(12) United States Patent
Chen et al.

(10) Patent No.: US 12,627,387 B2
(45) Date of Patent: May 12, 2026

(54) COMMUNICATION METHOD, ELECTRONIC DEVICE, AND SYSTEM FOR CROSS-DEVICE SWITCHING OF MULTIMEDIA CONTENT PLAYBACK

(71) Applicant: Huawei Technologies Co., Ltd., Shenzhen (CN)

(72) Inventors: Chong Chen, Shanghai (CN); Shuo Zhang, Beijing (CN); Hao Wang, Shenzhen (CN); Songping Yao, Beijing (CN); Wenhao Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 420 days.

(21) Appl. No.: 18/251,041

(22) PCT Filed: Sep. 1, 2021

(86) PCT No.: PCT/CN2021/116018
§ 371 (c)(1),
(2) Date: Apr. 28, 2023

(87) PCT Pub. No.: WO2022/088957
PCT Pub. Date: May 5, 2022

(65) Prior Publication Data
US 2024/0007211 A1 Jan. 4, 2024

(30) Foreign Application Priority Data
Oct. 28, 2020 (CN) .......................... 202011176711.6

(51) Int. Cl.
*H04H 20/18* (2008.01)
*G06K 19/07* (2006.01)
(Continued)

(52) U.S. Cl.
CPC ......... *H04H 20/18* (2013.01); *G06K 19/0723* (2013.01); *H04M 1/72412* (2021.01);
(Continued)

(58) Field of Classification Search
CPC ..... H04H 20/18; H04W 76/14; H04L 67/568; H04M 1/72412; H04M 1/72442; H04M 2250/02; G06K 19/0723
(Continued)

(56) References Cited

U.S. PATENT DOCUMENTS

| 2010/0151783 A1* | 6/2010 | Cohen | .................... H04H 60/80 |
| | | | 455/3.06 |
| 2014/0323036 A1* | 10/2014 | Daley | .................... H04H 20/38 |
| | | | 455/3.06 |

(Continued)

FOREIGN PATENT DOCUMENTS

| CN | 107071711 A | 8/2017 |
| CN | 111343622 A | 6/2020 |
| EP | 1940111 A2 | 7/2008 |

*Primary Examiner* — Chi Tang P Cheng
*Assistant Examiner* — Michael Wayne Maddox
(74) *Attorney, Agent, or Firm* — Conley Rose, P.C.

(57) ABSTRACT

A method implemented by a communication system, including at least a first electronic device and a second electronic device, includes that the first electronic device plays multimedia content. The first electronic device sends first synchronization information through broadcast, so that the second electronic device receives the first synchronization information, where the first synchronization information includes at least a first address, and the first address is an obtaining address of the multimedia content. In response to a preset operation, the first electronic device establishes a near field wireless communication connection to the second electronic device, and the second electronic device caches the multimedia content based on at least the first address. The first electronic device sends a control instruction to the (Continued)

second electronic device by using the near field wireless communication connection. The second electronic device plays the multimedia content based on the control instruction.

20 Claims, 3 Drawing Sheets

(51) Int. Cl.
  *H04M 1/72412*      (2021.01)
  *H04M 1/72442*      (2021.01)
  *H04W 76/14*       (2018.01)

(52) U.S. Cl.
  CPC ....... *H04M 1/72442* (2021.01); *H04W 76/14* (2018.02); *H04M 2250/02* (2013.01)

(58) Field of Classification Search
  USPC .......................................................... 370/503
  See application file for complete search history.

(56)                References Cited

U.S. PATENT DOCUMENTS

2018/0176685  A1*   6/2018   Tanaka ................... H03G 5/165
2018/0248994  A1*   8/2018   Lee ........................ H04W 12/50
2021/0405961  A1*  12/2021   Dong ....................... H04R 3/12
2022/0201452  A1*   6/2022   Lee .......................... H04B 5/77
2022/0279063  A1*   9/2022   Coffman ........... H04M 1/72442

* cited by examiner

Communication system 100

COMMUNICATION METHOD, ELECTRONIC DEVICE, AND SYSTEM FOR CROSS-DEVICE SWITCHING OF MULTIMEDIA CONTENT PLAYBACK

CROSS-REFERENCE TO RELATED APPLICATIONS

This is a U.S. National Stage of International Patent Application No. PCT/CN2021/116018 filed on Sep. 1, 2021, which claims priority to Chinese Patent Application No. 202011176711.6 filed on Oct. 28, 2020, both of which are hereby incorporated by reference in their entireties.

TECHNICAL FIELD

This application relates to the field of communication technologies, and in particular, to a communication method, an electronic device, and a system.

BACKGROUND

With the popularity of smartphones and smart speakers, music playback online on a smartphone can be switched to playback on a smart speaker, implementing cross-device switching of media playback.

When the existing smartphone and smart speaker implement cross-device switching of media playback, a Bluetooth connection between the smartphone and the smart speaker needs to be first established, and then, streaming media data is transmitted by using Bluetooth. After transmission of the streaming media data is completed, streaming media can be played on the smart speaker to implement cross-device switching of media playback. It can be learned that there is a problem of poor user experience because a relatively long delay exists in cross-device switching of media playback due to the Bluetooth connection and serial execution of media data transmission.

SUMMARY

Embodiments of this application provide a communication method, an electronic device, and a system, to resolve a problem of a relatively long delay when multimedia content is played across devices.

According to a first aspect, this application provides a communication method. The communication method is applied to a communication system, the communication system includes at least a first electronic device and a second electronic device, and the method includes: The first electronic device plays multimedia content. The first electronic device sends first synchronization information through broadcast, so that the second electronic device receives the first synchronization information, where the first synchronization information includes at least a first address, and the first address is an obtaining address of the multimedia content. In response to a preset operation, the first electronic device establishes a near field wireless communication connection to the second electronic device, and the second electronic device caches the multimedia content based on at least the first address. The first electronic device sends a control instruction to the second electronic device by using the near field wireless communication connection. The second electronic device plays the multimedia content based on the control instruction.

In this embodiment of this application, before establishing the near field wireless communication connection to the second electronic device, the first electronic device sends, through broadcast, the first synchronization information that includes at least the first address, so that the second electronic device receives the first synchronization information, to implement parallel execution. The first electronic device establishes the near field wireless communication connection to the second electronic device, and the second electronic device caches, based on the first address, multimedia content that is being played by the first electronic device, to reduce a delay caused when multimedia content is switched between devices for playing, and improve user using experience.

In a possible implementation, the first synchronization information further includes a first playback progress and a first playback speed of the multimedia content. That the second electronic device caches the multimedia content based on at least the first address in response to the preset operation includes: The second electronic device caches the multimedia content based on an estimated playback progress and the first address, where the estimated playback progress is determined based on the first playback progress, the first playback speed, a first time point, and a second time point, the first time point is a time point at which the second electronic device receives the first synchronization information, and the second time point is a time point at which the second electronic device detects that the preset operation occurs. According to the possible implementation, the second electronic device determines the estimated playback progress based on the first playback progress, the first playback speed, the first time point, and the second time point, and starts to cache the multimedia content from the estimated playback progress, so that a cache speed is increased, and a delay caused when multimedia content is switched for playing is further reduced.

In a possible implementation, the estimated playback progress is further determined based on a corrected time period. The second electronic device determines the estimated playback progress based on a sum of the first playback progress and a corrected playback progress, the corrected playback progress is determined based on a product of the first playback speed and a time difference, the time difference is determined based on a difference between a corrected second time point and the first time point, the corrected second time point is determined based on a sum of the second time point and the corrected time period, and the corrected time period is determined based on a time period required for completing establishment of the near field wireless communication connection, and/or data statistics analysis. According to the possible implementation, the corrected time period is added to a determining condition of the estimated playback progress, so that the estimated playback progress is more accurate.

In another possible implementation, the control instruction further carries second synchronization information, the second synchronization information includes a second address, a second playback progress, and a second playback speed, the second address, the second playback progress, and the second playback speed are respectively an obtaining address, a playback progress, and a playback speed of multimedia content played by the first electronic device at a third time point, and the third time point is a time point at which establishment of the near field wireless communication connection is completed. That the second electronic device plays the multimedia content based on the control instruction includes: The second electronic device compares the second address, the second playback speed, and the second playback progress with the first address, the first playback speed, the estimated playback progress, and a cache progress to obtain a comparison result, and caches or plays the multimedia content based on the comparison result, where the cache progress is a progress of multimedia content cached by the second electronic device at the third time point. According to the possible implementation, the control instruction carries real playback information, to ensure accuracy of switching the multimedia content across devices for playing.

In another possible implementation, the caching or playing the multimedia content based on the comparison result includes: The second electronic device determines whether the comparison result is one or more of the following results: the first address is different from the second address, the second playback progress is less than the estimated playback progress, and the second playback progress is greater than the cache progress. If the comparison result is one or more of the results, the second electronic device caches the multimedia content based on the second address and the second playback progress; or if the comparison result is not any one of the results, the second electronic device plays the multimedia content based on the second playback progress and the second playback speed.

In another possible implementation, the first electronic device includes an NFC module, an NFC tag is set on the second electronic device, and identification information of the second electronic device is stored on the NFC tag. The preset operation is a read operation of reading, by the first electronic device by using the NFC module, the identification information that is of the second electronic device and that is stored on the NFC tag. That the first electronic device establishes a near field wireless communication connection to the second electronic device in response to a preset operation, and the second electronic device caches the multimedia content based on at least the first address in response to the preset operation includes: The first electronic device reads the identification information of the second electronic device, and establishes the near field wireless communication connection to the second electronic device based on the identification information. When the second electronic device detects an operation for the NFC tag to be read, the second electronic device caches the multimedia content based on the first address.

In an example, the identification information includes at least one or more of a MAC address of the second electronic device, an IP address of the second electronic device, and an ID of the second electronic device.

In another possible implementation, that the first electronic device sends first synchronization information through broadcast includes: The first electronic device sends, through broadcast, a data packet by using a first preset sending periodicity, and if the first address and/or a multimedia content playback parameter change/changes, the first electronic device sends, through broadcast, a data packet by using a second preset sending periodicity within a first preset time period, where the second preset sending periodicity is less than the first preset sending periodicity, the data packet carries the first synchronization information, and the multimedia content playback parameter includes at least a playback speed.

In another possible implementation, the data packet further carries a hash value of an ID of an electronic device that meets a requirement, and the hash value is used by an electronic device that receives the data packet to determine whether to parse the data packet.

In another possible implementation, before the first electronic device sends first synchronization information through broadcast, the method further includes: The first electronic device enables a near field discovery function, the second electronic device enables a near field discoverability function, and the first electronic device finds a potential target device, where the potential target device is: an electronic device that is bound to or has a same account as the first electronic device, an electronic device that establishes the near field wireless communication connection to the first electronic device before a second preset time period, and/or an electronic device that has a preset configuration file.

In another possible implementation, that the first electronic device enables a near field discovery function includes: The first electronic device determines whether the first electronic device establishes the near field wireless communication connection to another electronic device within a third preset time period, and if the first electronic device establishes the near field wireless communication connection to another electronic device within the third preset time period, enables the near field discovery function.

In another possible implementation, the near field wireless communication connection is a BLE connection. That the first electronic device establishes a near field wireless communication connection to the second electronic device in response to a preset operation includes: The first electronic device and the second electronic device establish the BLE connection respectively by using a first preset BLE connection parameter and a second preset BLE connection parameter, where the first preset BLE connection parameter includes at least one or more of a preset BLE scanning periodicity and a preset connection scanning duty cycle parameter, and the second preset BLE connection parameter includes a preset BLE broadcast sending periodicity.

According to a second aspect, this application provides a communication method. The communication method is applied to a first electronic device, and the method includes: The first electronic device plays multimedia content. The first electronic device sends first synchronization information through broadcast, so that a second electronic device receives the first synchronization information, where the first synchronization information includes at least a first address, and the first address is an obtaining address of the multimedia content. The first electronic device establishes a near field wireless communication connection to the second electronic device in response to a preset operation, where the preset operation is used to trigger the first electronic device to establish the near field wireless communication connection to the second electronic device, and trigger the second electronic device to cache the multimedia content based on at least the first address. The first electronic device sends a control instruction to the second electronic device by using the near field wireless communication connection, where the control instruction is used to control the second electronic device to play the multimedia content.

In a possible implementation, the first synchronization information further includes a first playback progress and a first playback speed of the multimedia content. The first playback progress and the first playback speed are used to determine an estimated playback progress together with a first time point and a second time point, and the estimated playback progress is used by the second electronic device to cache the multimedia content based on the estimated playback progress and the first address. The first time point is a time point at which the second electronic device receives the first synchronization information, and the second time point is a time point at which the second electronic device detects that the preset operation occurs.

In another possible implementation, the estimated playback progress is further determined based on a corrected time period. The estimated playback progress is determined based on a sum of the first playback progress and a corrected playback progress, the corrected playback progress is determined based on a product of the first playback speed and a time difference, the time difference is determined based on a difference between a corrected second time point and the first time point, the corrected second time point is determined based on a sum of the second time point and the corrected time period, and the corrected time period is determined based on a time period required for completing establishment of the near field wireless communication connection, and/or data statistics analysis.

In another possible implementation, the control instruction further carries second synchronization information, the second synchronization information includes a second address, a second playback progress, and a second playback speed, the second address, the second playback progress, and the second playback speed are respectively an obtaining address, a playback progress, and a playback speed of multimedia content played by the first electronic device at a third time point, and the third time point is a time point at which establishment of the near field wireless communication connection is completed. The second synchronization information is used by the second electronic device to compare the second address, the second playback speed, and the second playback progress with the first address, the first playback speed, the estimated playback progress, and a cache progress to obtain a comparison result, and caches or plays the multimedia content based on the comparison result, where the cache progress is a progress of multimedia content cached by the second electronic device at the third time point.

In another possible implementation, the caching or playing the multimedia content based on the comparison result includes: The second electronic device determines whether the comparison result is one or more of the following results: the first address is different from the second address, the second playback progress is less than the estimated playback progress, or the second playback progress is greater than the cache progress. If the comparison result is one or more of the results, the second electronic device caches the multimedia content based on the second address and the second playback progress: or if the comparison result is not any one of the results, the second electronic device plays the multimedia content based on the second playback progress and the second playback speed.

In another possible implementation, the first electronic device includes an NFC module, an NFC tag is set on the second electronic device, and identification information of the second electronic device is stored on the NFC tag. That the first electronic device establishes a near field wireless communication connection to the second electronic device in response to a preset operation includes: The preset operation is a read operation of reading, by the first electronic device by using the NFC module, the identification information that is of the second electronic device and that is stored on the NFC tag. The first electronic device reads the identification information of the second electronic device, and establishes the near field wireless communication connection to the second electronic device based on the identification information.

In another possible implementation, the identification information includes at least one or more of a MAC address of the second electronic device, an IP address of the second electronic device, and an ID of the second electronic device.

In another possible implementation, that the first electronic device sends first synchronization information through broadcast includes: The first electronic device sends, through broadcast, a data packet by using a first preset sending periodicity, and if the first address and/or a multimedia content playback parameter change/changes, the first electronic device sends, through broadcast, a data packet by using a second preset sending periodicity within a first preset time period, where the second preset sending periodicity is less than the first preset sending periodicity, the data packet carries the first synchronization information, and the multimedia content playback parameter includes at least a playback speed.

In another possible implementation, the data packet further carries a hash value of an ID of an electronic device that meets a requirement, and the hash value is used by an electronic device that receives the data packet to determine whether to parse the data packet.

In another possible implementation, before the first electronic device sends first synchronization information through broadcast, the method further includes: The first electronic device enables a near field discovery function, and the first electronic device finds a potential target device, where the potential target device is: an electronic device that is bound to or has a same account as the first electronic device, an electronic device that establishes the near field wireless communication connection to the first electronic device before a second preset time period, and/or an electronic device that has a preset configuration file.

In another possible implementation, that the first electronic device enables a near field discovery function includes: The first electronic device determines whether the first electronic device establishes the near field wireless communication connection to another electronic device within a third preset time period, and if the first electronic device establishes the near field wireless communication connection to another electronic device within the third preset time period, enables the near field discovery function.

In another possible implementation, the near field wireless communication connection is a BLE connection. That the first electronic device establishes a near field wireless communication connection to the second electronic device in response to a preset operation includes: The first electronic device establishes the BLE connection to the second electronic device by using a preset BLE connection parameter, where the preset BLE connection parameter includes at least one or more of a preset BLE scanning periodicity and a preset connection scanning duty cycle parameter.

According to a third aspect, this application provides a communication method. The communication method is applied to a first electronic device, and the method includes: A second electronic device receives first synchronization information, where the first synchronization information is sent by a first device through broadcast, the first synchronization information includes at least a first address, the first address is an obtaining address of multimedia content, and the multimedia content is content played by the first electronic device. The second electronic device caches the multimedia content based on at least the first address in response to a preset operation, where the preset operation is used to trigger the first electronic device to establish a near field wireless communication connection to the second electronic device, and trigger the second electronic device to cache the multimedia content based on at least the first address. The second electronic device plays the multimedia content based on a control instruction, where the control instruction is sent by the first electronic device to the second electronic device by using the near field wireless communication connection.

In a possible implementation, the first synchronization information further includes a first playback progress and a first playback speed of the multimedia content. The first playback progress and the first playback speed are used to determine an estimated playback progress together with a first time point and a second time point, and the second electronic device caches the multimedia content based on the estimated playback progress and the first address. The first time point is a time point at which the second electronic device receives the first synchronization information, and the second time point is a time point at which the second electronic device detects that the preset operation occurs.

In another possible implementation, the estimated playback progress is further determined based on a corrected time period. The estimated playback progress is determined based on a sum of the first playback progress and a corrected playback progress, the corrected playback progress is determined based on a product of the first playback speed and a time difference, the time difference is determined based on a difference between a corrected second time point and the first time point, the corrected second time point is determined based on a sum of the second time point and the corrected time period, and the corrected time period is determined based on a time period required for completing establishment of the near field wireless communication connection, and/or data statistics analysis.

In another possible implementation, the control instruction further carries second synchronization information, the second synchronization information includes a second address, a second playback progress, and a second playback speed, the second address, the second playback progress, and the second playback speed are respectively an obtaining address, a playback progress, and a playback speed of multimedia content played by the first electronic device at a third time point, and the third time point is a time point at which establishment of the near field wireless communication connection is completed. The second electronic device compares the second address, the second playback speed, and the second playback progress with the first address, the first playback speed, the estimated playback progress, and a cache progress to obtain a comparison result, and caches or plays the multimedia content based on the comparison result, where the cache progress is a progress of multimedia content cached by the second electronic device at the third time point.

In another possible implementation, the caching or playing the multimedia content based on the comparison result includes: The second electronic device determines whether the comparison result is one or more of the following results: the first address is different from the second address, the second playback progress is less than the estimated playback progress, or the second playback progress is greater than the cache progress. If the comparison result is one or more of the results, the second electronic device caches the multimedia content based on the second address and the second playback progress; or if the comparison result is not any one of the results, the second electronic device plays the multimedia content based on the second playback progress and the second playback speed.

In another possible implementation, the first electronic device includes an NFC module, an NFC tag is set on the second electronic device, and identification information of the second electronic device is stored on the NFC tag. That the second electronic device caches the multimedia content based on at least the first address in response to a preset operation includes: The preset operation is a read operation of reading, by the first electronic device by using the NFC module, the identification information that is of the second electronic device and that is stored on the NFC tag. When the second electronic device detects an operation for the NFC tag to be read, the second electronic device caches the multimedia content based on the first address.

In another possible implementation, the identification information includes at least one or more of a MAC address of the second electronic device, an IP address of the second electronic device, and an ID of the second electronic device.

In another possible implementation, the near field wireless communication connection is a BLE connection.

That the first electronic device establishes a near field wireless communication connection to the second electronic device in response to a preset operation includes:

The second electronic device establishes a BLE connection by using a preset BLE connection parameter, where the preset BLE connection parameter includes a preset BLE broadcast sending periodicity.

According to a fourth aspect, this application provides an electronic device, including a memory and a processor. The memory stores executable code, and the processor executes the executable code to implement the method provided in the second aspect or the third aspect of this application.

According to a fifth aspect, this application provides a computer-readable storage medium. The computer-readable storage medium stores a computer program, and when the computer program is executed in a computer, the computer is enabled to perform the method provided in the second aspect or the third aspect of this application.

According to a sixth aspect, this application provides a computer program or a computer program product. The computer program or the computer program product includes instructions, and when the instructions are executed, the method provided in the second aspect or the third aspect of this application is implemented.

DESCRIPTION OF EMBODIMENTS

The technical solutions of this application are further described in detail with reference to accompanying drawings and embodiments as follows.

Figures 1, 2:
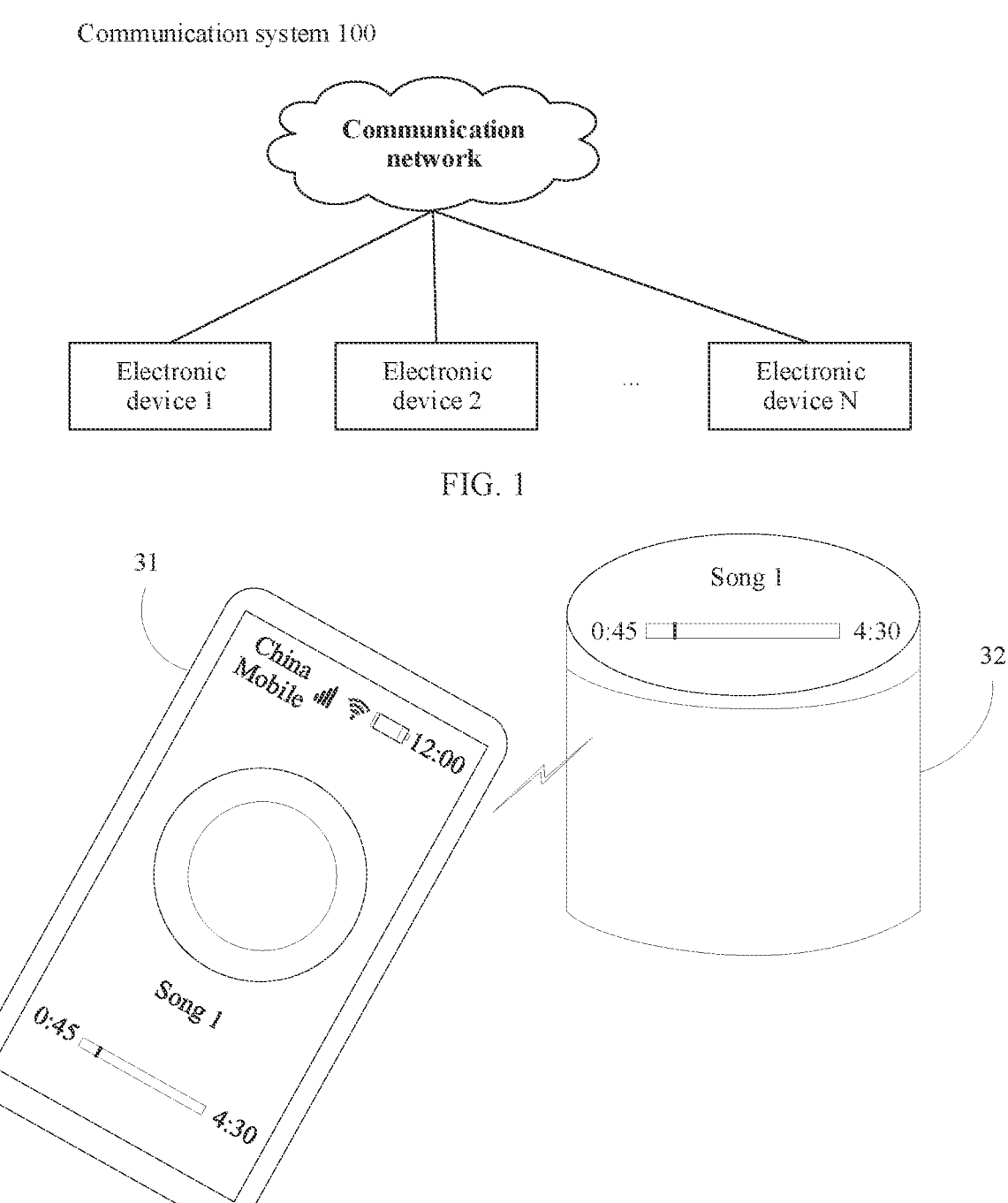
FIG. 1 is a schematic diagram of an architecture of a communication system according to an embodiment of this application.
FIG. 2 is a schematic diagram of an application scenario according to an embodiment of this application.

An embodiment of this application provides a communication method. The communication method may be applied to a communication system 100 shown in FIG. 1. As shown in FIG. 1, the communication system 100 includes N electronic devices, for example, an electronic device 1, an electronic device 2, . . . , and an electronic device N. N is a positive integer greater than 1, and the N electronic devices are in communication connection by using a communication network.

For example, the communication network may be a wired communication network, a wireless communication network, a local area network (local area network, LAN), or a wide area network (wide area networks, WAN), such as the Internet. The communication network may be implemented by using any known network communication protocol. The communication protocol may be various wired or wireless communication protocols, such as Ethernet, universal serial bus (universal serial bus, USB), a firewire (Firewire), global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution. LTE), Bluetooth, wireless fidelity (wireless fidelity, Wi-Fi), and near field communication (near field communication, NFC), voice over Internet protocol (voice over Internet protocol, VoIP), a communication protocol that supports a network slice architecture, a 5G communication protocol, or any other suitable communication protocol.

The electronic device 1 is in communication connection with the electronic device 2, the electronic device 1 may switch multimedia content that can be played by the electronic device 1 to the electronic device 2 for playing, and the electronic device 1 sends a control instruction to the electronic device 2 to control playing of the multimedia content.

A manner of establishing a communication connection between the electronic device 1 and the electronic device 2 may be near field communication connection. When the electronic device 1 obtains identification information of the electronic device 2, the electronic device 1 establishes a communication connection to the electronic device 2, and the electronic device 2 plays multimedia content that is being played or is to be played on the electronic device 1, to implement cross-device playback of media data by "switching a playback device by one touch".

It may be understood that both the electronic device 1 and the electronic device 2 have a near field communication function, for example, near field communication (near field communication, NFC), Bluetooth, ZigBee (ZigBee), wireless fidelity (wireless fidelity. Wi-Fi), ultra-wideband (UWB), infrared data association (IrDA) network, or another near field communication function. The electronic device 1 may be an electronic device such as a smartphone, a tablet computer, a personal digital assistant (Personal Digital Assistant, PDA), or a wearable electronic device. The electronic device 2 may be a device with a playback function such as a smart speaker, a smart television, a notebook computer, or a vehicle-mounted playback device. The multimedia content may include text content, picture content, video content, audio content, and the like.

The following describes a cross-device playback method of media data provided in the embodiments of this application by using an example in which the electronic device 1 is a smartphone, the electronic device 2 is a smart speaker, and the media data is audio data.

FIG. 2 is a schematic diagram of an application scenario according to an embodiment of this application. An execution body includes a smartphone 31 and a smart speaker 32. Both the smartphone 31 and the smart speaker have NFC and Bluetooth connection functions. When the smartphone 31 plays a song "song 1", the smartphone 31 reads identification information (for example, MAC address information) of the smart speaker 32 by using NFC, and the smartphone 31 establishes a Bluetooth connection to the smart speaker 32 based on the identification information, and switches the song "song 1" played by the smartphone 31 to the smart speaker 32 for playing, to implement a function of "audio transmission by one touch".

Figure 3:
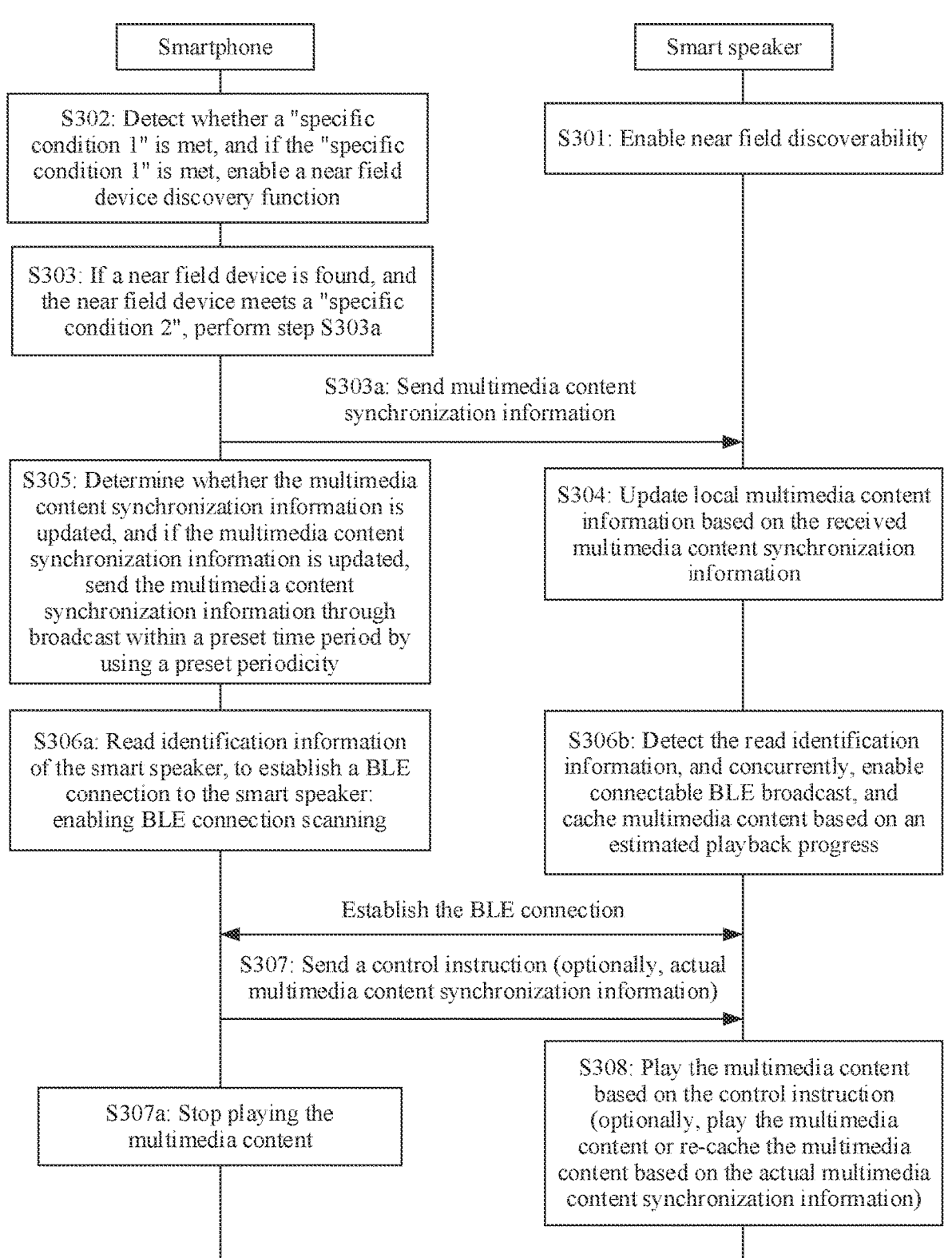
FIG. 3 is a flowchart of a communication method in a scenario shown in FIG. 2 according to an embodiment of this application.

FIG. 3 is a flowchart of a communication method in a scenario shown in FIG. 2 according to an embodiment of this application. As shown in FIG. 3, the method includes step S301: A smart speaker enables a near field device discoverability function, for example, a Bluetooth connection function, and enables a device discoverability option. This step may be manually enabled by a user or automatically enabled after the smart speaker is powered on.

Optionally, the method further includes step S302: The smartphone detects whether a "specific condition 1" is met, and if the "specific condition 1" is met, enables a near field device discovery function.

The "specific condition 1" mentioned above may be that the smartphone currently is playing multimedia content, and the device locally has a configuration file or a record of "audio transmission by one touch", and uses the function of "audio transmission by one touch" recently (for example, within 10 days). If the smartphone meets the "specific condition 1", the near field device discovery function is enabled. For example, a Bluetooth connection function is enabled to scan and find a nearby device that can be connected. In this way, the near field device discovery function can be automatically enabled without a manual operation of the user, thereby reducing user operation frequency and improving user using experience.

Certainly, step S302 may alternatively be replaced with that the smartphone opens a near field device discovery function based on a user instruction. For example, a user opens the near field device discovery function of the smartphone by using a manual operation, and the user selects, based on a requirement of the user, whether to enable the near field device discovery function of the smartphone, to prevent the smartphone from enabling the near field device discovery function when unnecessary, thereby reducing energy consumption of the smartphone.

Step S303: If the smartphone finds a near field device, and the near field device meets a "specific condition 2", perform step S303*a*.

That the smartphone finds the near field device means that the smartphone scans and finds a nearby device that can be connected by using Bluetooth, that is, searches for and finds, within a Bluetooth effective connection range of the Bluetooth smartphone, an electronic device that can be connected. In addition, to reduce energy consumption of the smartphone, the "specific condition 2" is set in the smartphone, and first synchronization information is sent through broadcast only when the specific condition 2 is met. The "specific condition" may be that there is a potential target device in a near field device found by the smartphone and/or the smartphone and the potential target device use the function of "audio transmission by one touch" recently (for example, within 10 days). The potential target device is a smart speaker that has NFC and Bluetooth functions and that is bound to the smartphone, or a smart speaker that has NFC and Bluetooth functions and that has a same account (for example, a same Huawei account) as the smartphone. To avoid that the user does not want to use the function of "audio transmission by one touch", the smartphone still sends media data synchronization information to a smart speaker side, thereby increasing energy consumption of the smartphone.

It may be understood that a meaning of the potential target device is: a smart speaker that can be in communication connection with the smartphone to implement the function of "audio transmission by one touch", but is not determined as a target device.

Step S303*a*: The smartphone sends multimedia content synchronization information through broadcast. Specifically, the multimedia content synchronization information (that is, the first synchronization information) includes at least: a first address, a first playback speed, and a first playback progress. The first address, the first playback speed, and the first playback progress are respectively an obtaining address (for example, a URI (Uniform Resource Identifier, uniform resource identifier) of multimedia content data or a URL (Uniform Resource Locator, uniform resource locator) of multimedia content data) of multimedia content, a playback progress (for example, a playback timestamp of the multimedia content) of the multimedia content, and a playback speed (for example, a playback frame rate of media content) of the multimedia content.

For example, the smartphone sends, through broadcast, a broadcast data packet including the multimedia content synchronization information, and the broadcast data packet is sent by using a preset broadcast periodicity of a first threshold. For example, the first threshold may be 1024 ms. Certainly, there may be a plurality of manners in which the smartphone sends the data packet through broadcast, for example, sends the data packet through broadcast by using BLE, or sends the data packet through broadcast by using a local area network. This is not limited in this application.

In some embodiments, the broadcast data packet further includes a hash value of an ID of the potential target device, to limit that only the potential target device can process and parse the broadcast data packet to obtain the multimedia content synchronization information, and limit a broadcast impact range.

Step S304: The smart speaker updates local multimedia content information based on the received first synchronization information.

Specifically, the smart speaker receives the broadcast data packet, parses the broadcast data packet to obtain the multimedia content synchronization information, and updates the local multimedia content information based on the first synchronization information. The smart speaker receives the broadcast data packet, verifies whether a hash value of the broadcast data packet is the same as a hash value of an ID of the smart speaker, and if the hash value of the broadcast data packet is the same as the hash value of the ID of the smart speaker, parses the broadcast data packet to obtain the first synchronization information, and updates the locally stored multimedia content information based on the first synchronization information.

Step S305: The smartphone determines whether the obtaining address of the multimedia content and/or the playback speed of the multimedia content are/is updated, and if the obtaining address of the multimedia content and/or the playback speed of the multimedia content are/is updated, sends, within a preset time period by using a preset sending periodicity, the broadcast data packet including the multimedia content synchronization information.

Specifically, it is determined whether the URI (for example, the smartphone switches a song) of the multimedia content data and/or the playback speed (for example, the smartphone pauses/fast forwards/rewinds playing a song) of the multimedia content change/changes. If the broadcast data packet including the multimedia content synchronization information is sent within the preset time period by using the preset sending periodicity, for example, the smartphone sends, within 20 s by using the preset sending periodicity, the broadcast data packet including the multimedia content synchronization information, it may be understood that the preset sending periodicity herein is 64 ms, and the preset sending periodicity herein is less than an original broadcast sending periodicity of the smartphone. For example, the original broadcast sending periodicity is 128 ms.

Step S306: The smartphone obtains identification information of the smart speaker, and the smartphone establishes a Bluetooth connection to the smart speaker, and concurrently, the smart speaker starts caching the multimedia content based on the first synchronization information.

It may be understood that an NFC tag (which may also be referred to as an NFC sticker) is set on the smart speaker, and the NFC tag stores at least the identification information of the smart speaker. The identification information may be information that can uniquely identify the smart speaker, such as a MAC (media access control, media access control) address, a device name, or an IP address of the smart speaker. A location at which the NFC tag is set on the smart speaker is defined as an NFC sensing area.

Refer to FIG. 2. When the user wants to switch a song that is being played on the smartphone to the smart speaker for playing, the user may make the smartphone approach/touch the NFC sensing area of the smart speaker. When a distance between the smartphone and the NFC tag is close enough (for example, 10 cm), the smartphone reads the identification information of the smart speaker, for example, a MAC address of the smart speaker, from the NFC tag by transmitting a near field signal.

That is, the smartphone may determine, by reading the MAC address of the smart speaker, that a current target device is the smart speaker, and then, the smartphone establishes a Bluetooth connection to the smart speaker based on the identification information of the smart speaker, and projects the song that is being played on the smartphone to the smart speaker for playing.

It is easy to understand that, before the smartphone approaches/touches the smart speaker, the smartphone has enabled an NFC function. For example, the NFC function may be manually enabled by the user, or may be set to be automatically enabled after a song is played.

The smart speaker detects that the NFC tag is read, that is, starts to cache the media data based on the first synchronization information, to implement concurrent execution of Bluetooth connection and data transmission. Compared with an existing cross-device playback method of media data, a serial solution in which Bluetooth connection is first performed and then media data transmission is performed is provided, thereby greatly reducing a delay of cross-device playback of the media data, implementing seamless switching of the media data between the smartphone and the smart speaker, and improving user using experience.

Specifically, step S306 includes S306.*a*: The smartphone enables Bluetooth connection scanning, and requests to establish a Bluetooth connection to the smart speaker. S306.*b*: The smart speaker concurrently enables Bluetooth connection scanning and establishes, based on the URI of the multimedia content data in the first synchronization information, a connection to a server that stores the multimedia content data, and then obtains, based on the playback progress of the multimedia content and the playback speed of the multimedia content, an estimated playback progress of establishing the Bluetooth connection between the smartphone and the smart speaker and switching the multimedia content to the Bluetooth speaker for playing, and then the smart speaker starts to cache the media data from an estimated playback progress node.

The estimated playback progress may be obtained by using the following formula: $P_{estimate}=P_{last}+S*(T_{current}-T_{last\ update}-T_{delta\ fix})$. $P_{estimate}$ represents the estimated playback progress, $P_{last}$ represents a playback progress (that is, the first playback progress in the first synchronization information received at a first time point) of multimedia content in the first synchronization information received for the last time when the smart speaker detects that the NFC tag is read. S represents the playback speed of the multimedia content. $T_{current}$ represents a time point (that is, a second time point) on the smart speaker when the smart speaker detects that the NFC tag is read. $T_{last\ update}$ represents a time point (that is, the first time point) on the smart speaker that receives the first synchronization information for the last time when the smart speaker detects that the NFC tag is read. $T_{delta\ fix}$ represents a time difference corrected value. The corrected value may be obtained based on a time period required for establishing the Bluetooth connection between the smartphone and the smart speaker. For example, if it is obtained through statistics that a minimum time period required for establishing the Bluetooth connection between the smartphone and the smart speaker is 400 ms, the corrected value $T_{delta\ fix}$ is −400 ms. Alternatively, the corrected value is obtained through statistical analysis of a large amount of data.

In another example, in the foregoing formula, $T_{current}$ may be replaced with a time point on the smartphone when the smartphone reads the identification information of the smart speaker, and $T_{last\ update}$ may be replaced with a time point on the smartphone that sends the multimedia content synchronization information for the last time when the smartphone reads the identification information of the smart speaker.

In another example, when actually caching the multimedia content, the smart speaker may preset a playback progress in advance based on the estimated playback progress, and then cache the multimedia content. For example, if the preset playback progress is 1 s, and the estimated playback progress is 25 s, the smart speaker starts to cache the multimedia content from the 24$^{th}$ second, so that multimedia content perceived by the user is played more coherently, thereby improving user using experience.

Certainly, to increase a Bluetooth connection speed, the smart speaker sets an optimized Bluetooth connection parameter, for example, increases Bluetooth connection scanning frequency, so that the Bluetooth connection is established more quickly between the smartphone and the smart speaker.

Further, when the smartphone obtains the identification information of the smart speaker, the smartphone sets the optimized Bluetooth connection parameter, for example, increases connection scanning frequency and/or increases a connection scanning duty cycle parameter, to further increase the Bluetooth connection speed between the smartphone and the smart speaker.

It may be understood that "the smartphone reads the identification information of the Bluetooth speaker by using NFC" is only a triggering manner for establishing the Bluetooth connection between the smartphone and the smart speaker, and may also be another triggering manner. For example, the smartphone detects that a button for establishing the Bluetooth connection to the smart speaker is triggered, or detects a voice command for establishing the Bluetooth connection to the smart speaker.

Step S307: The smartphone sends a control instruction to the smart speaker by using Bluetooth, to control the smart speaker to play media data.

In some embodiments, step S307 further includes step S307.a: The smartphone stops playing the multimedia content. That is, when completing the Bluetooth connection to the smart speaker, the smartphone stops playing the multimedia content, and switches the multimedia content to the smart speaker for playing.

Step S308: The smart speaker starts to play the multimedia content based on the estimated playback progress, and plays the multimedia content based on the received control instruction sent by the smartphone.

In some embodiments, step S307 further includes: The smartphone sends an actual playback progress of the multimedia content to the smart speaker, where the actual playback progress is a playback progress when the smartphone stops playing the multimedia content. In an example, when completing the Bluetooth connection to the smart speaker, the smartphone stops playing the multimedia content. If it is defined that a time point on the smart speaker when the smartphone completes the Bluetooth connection to the smart speaker is a third time point, the actual playback progress is a playback progress of the multimedia content at the third time point, and the actual playback progress is a second playback progress.

Figure 4:
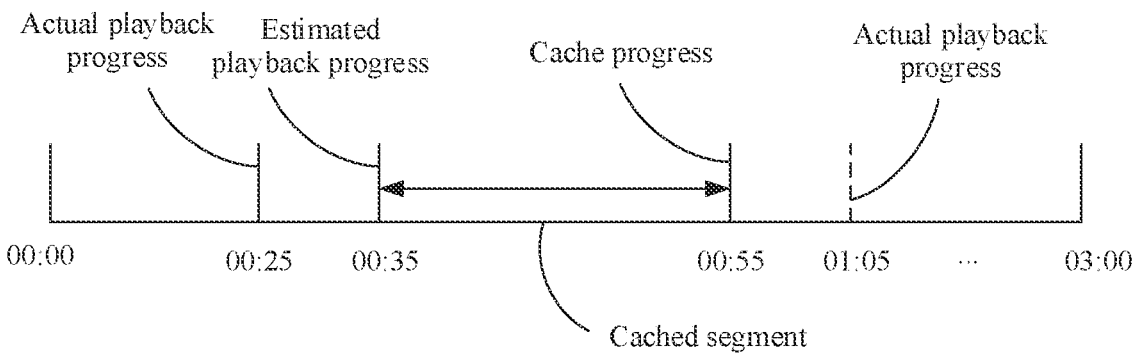
FIG. 4 is a schematic diagram in which an actual playback progress does not fall into a cached multimedia content segment according to an embodiment of this application.

Specifically, the following steps are included. Step S307.1: The smart speaker compares the actual playback progress, the estimated playback progress, and a cache progress (the cache progress is a progress of multimedia content cached by the smart speaker at the third time point) to obtain a comparison result, determines whether the comparison result is that the actual playback progress is less than the estimated playback progress or the actual playback progress is greater than the cache progress, and if the comparison result is that the actual playback progress is less than the estimated playback progress or the actual playback progress is greater than the cache progress, performs step S308.2: or if the comparison result is neither that the actual playback progress is less than the estimated playback progress nor that the actual playback progress is greater than the cache progress, performs step S308.1. S308.1: The smart speaker re-caches the multimedia content based on the actual playback progress. S308.2: Play the multimedia content based on the actual playback progress. As shown in FIG. 4, the actual playback progress does not fall within a cached multimedia content segment. It may be understood that the progress may be represented by a timestamp. For example, if a song is played to the 45$^{th}$ second, the playback progress may be represented as 45 s. If the song is cached to the 50$^{th}$ second, the cache progress may be represented as 50 s. If the actual playback progress does not fall within the cached multimedia content segment, the actual playback progress is less than the estimated playback progress or the actual playback progress is greater than the cache progress. For example, if the estimated playback progress is 25 s, and the cache progress is 45 s, the cached multimedia content segment is from the 35$^{th}$ second to the 55$^{th}$ second. If the actual playback progress is less than 35 s or greater than 55 s, the smart speaker needs to re-cache the multimedia content based on the actual playback progress. Playing the media data based on the actual playback progress means starting playing the media data from an actual playback time. For example, if the estimated playback progress is 43 s, the smart speaker caches the song from the $43^{rd}$ second, and if the time playback progress is 45 s, the smart speaker starts playing the song from the $45^{th}$ second.

In some other embodiments, step S307 further includes: The smartphone sends an obtaining address (for example, a URI of actual multimedia content data or a URL of actual multimedia content data) of actual multimedia content to the smart speaker. Specifically, step S307.2 is included. Step S307.2: The smart speaker compares the received obtaining address of actual multimedia content data with the obtaining address of the multimedia content in the first synchronization information received for the last time when the smart speaker detects that the NFC tag is read, to determine whether the two obtaining addresses are consistent, and caches/plays the multimedia content based on a comparison result. Specifically, if the obtaining address of the actual multimedia content is consistent with the obtaining address of the multimedia content in the multimedia content synchronization information received for the last time when the smart speaker detects that the NFC tag is read, the multimedia content is played based on the actual playback progress. If the obtaining address of the actual multimedia content is not consistent with the obtaining address of the multimedia content in the multimedia content synchronization information received for the last time when the smart speaker detects that the NFC tag is read, the multimedia content is cached based on the obtaining address of the actual multimedia content and the actual playback progress. It should be explained that the obtaining address of the actual multimedia content is an obtaining address of the multimedia content when the smartphone and the smart speaker successfully establish the Bluetooth connection.

In some embodiments, step S307 further includes: The smartphone sends a playback speed of the actual multimedia content to the smart speaker. Specifically, step S307.3 is included. Step S307.3: The smart speaker plays the media data based on the playback speed of the actual multimedia content. It may be understood that the playback speed of the actual multimedia content is a playback speed of the multimedia content when the smartphone and the smart speaker successfully establish the Bluetooth connection.

In some embodiments, the actual playback progress of the multimedia content, the obtaining address of the actual multimedia content, and the playback speed of the actual multimedia content (that is, a second playback progress, a second address, and a second playback speed that are included in second synchronization information) may also be carried in the control instruction and sent to the smart speaker.

In some embodiments, the method further includes step S309: The smartphone sends, to the smart speaker, information about multimedia content to be played. For example, information such as a playlist, a URI of multimedia content data in the playlist, and a playback loop mode. Step S310: The smart speaker caches the multimedia content to be played while playing, based on the received information about the multimedia content to be played, the current multimedia content. For example, if a song being played is a "song 1", a next song in the playlist is a "song 2", and the loop mode is list loop, it is determined that the next song to be played is the "song 2", and the smart speaker caches the next song to be played, namely, the "song 2" while playing the "song 1". Step S309 is performed after step S308 or step S308.1.

In some other embodiments, the method further includes step S311: The smartphone caches the multimedia content based on the playlist and the playback loop mode. Step S312: When the smartphone approaches/touches the smart speaker again to read the identification information of the smart speaker, the smartphone disconnects from the smart speaker, the smartphone obtains a playback progress of the multimedia content when disconnection occurs, and the smartphone plays the multimedia content based on the playback progress of the multimedia content. Step S313: If the smart speaker detects that the smartphone approaches/touches the smart speaker again to read the identification information of the smart speaker, the smart speaker disconnects from the smartphone, stops playing the multimedia content, and stops caching the multimedia content. Step S311 is performed after step S308 or step S308.1.

In some other embodiments, the method further includes step S314: The smartphone obtains a real-time playback progress of the multimedia content on the smart speaker. Step S315: When the smartphone approaches/touches the smart speaker again to read the identification information of the smart speaker, the smartphone disconnects from the smart speaker, the smartphone obtains the real-time playback progress when disconnection occurs and caches the multimedia content, and the smartphone plays the multimedia content. Step S316: If the smart speaker detects that the smartphone approaches/touches the smart speaker again to read the identification information of the smart speaker, the smart speaker disconnects from the smartphone, stops playing the multimedia content, and stops caching the multimedia content. Step S314 is performed after step S308 or step S308.1.

In some other embodiments, the method further includes step S317: When the smartphone approaches/touches the smart speaker again to read the identification information of the smart speaker, the smartphone disconnects from the smart speaker, the smartphone obtains a playback progress of the multimedia content when disconnection occurs, the smartphone caches the multimedia content based on the playback progress of the multimedia content, and the smartphone plays the multimedia content. Step S318: if the smart speaker detects that the smartphone approaches/touches the smart speaker again to read the identification information of the smart speaker, the smart speaker disconnects from the smartphone, stops playing the multimedia content, and stops caching the multimedia content. Step S317 is performed after step S308 or step S308.1.

In some embodiments, "concurrently, the smart speaker starts caching the multimedia content based on the multimedia content synchronization information" in step S306 may be performed before the smartphone reads the identification information of the smart speaker. To be specific, before detecting that the NFC tag is read, the smart speaker starts caching the multimedia content data based on the multimedia content synchronization information. When detecting that the NFC tag is read, the smart speaker only needs to execute a Bluetooth connection process between the smartphone and the smart speaker. After the Bluetooth connection is completed, the smart speaker obtains the playback progress of the multimedia content, and then plays the cached multimedia content data based on the playback progress, thereby further reducing a delay.

In some embodiments, after step S305, the method further includes step S305.1: The smartphone and/or the smart speaker obtain/obtains a network status of a communication network in which the smartphone and/or the smart speaker are/is located, and determine/determines, based on the network status of the smartphone and/or the network status of the smart speaker, to perform step S306.1 or step S306.2. Step S306.1: The smartphone obtains identification information of the smart speaker, and the smartphone establishes a Bluetooth connection to the smart speaker, and concurrently, the smart speaker starts caching the multimedia content based on the multimedia content synchronization information. Step S306.2 includes: Start caching the multimedia content based on media data synchronization information. The smartphone obtains the identification information of the smart speaker, and establishes the Bluetooth connection to the smart speaker. After step S306.1 and step S306.2, step S307 to step S308, step S307 to step S308.1, step S307 to step S310, step S307 to step S313, step S307 to step S316, or step S307 to step S318 are performed.

It may be understood that, the network status includes a network speed, and it is determined based on the network status, to perform step S306.1 or step S306.2. Specifically, it is determined whether the network speed is greater than a threshold (for example, 1 M/s). If the network speed is greater than the threshold (for example, 1 M/s), step S306.1 is performed. If the network speed is not greater than the threshold (for example, 1 M/s), step S306.2 is performed. To be specifically, when the network status is relatively good, "the smart speaker starts caching the multimedia content data based on the multimedia content synchronization information" may be performed after the smartphone obtains the identification information of the smart speaker, and when the network status is relatively poor, "the smart speaker starts caching the multimedia content data based on the multimedia content synchronization information" is performed before the smartphone obtains the identification information of the smart speaker, to ensure that the smart speaker caches the multimedia content data before establishment of the Bluetooth connection between the smart speaker and the smartphone is completed, thereby reducing a delay of cross-device playback of the media data.

In some other embodiments, to further reduce a delay of cross-device playback of the media data, the foregoing Bluetooth is BLE (Bluetooth Low Energy, Bluetooth Low Energy). To be specific, both the smartphone and the smart speaker support a BLE technology. A BLE connection rate is 300 ms or faster, while a conventional Bluetooth connection rate is 3 s. A BLE connection is used to implement a faster connection speed and lower energy consumption.

This application provides a computer-readable storage medium. The computer-readable storage medium stores a computer program, and when the computer program is executed in a computer, the computer is enabled to perform the communication method provided above.

This application provides a computer program or a computer program product. The computer program or the computer program product includes instructions, and when instructions are executed, the communication method provided above is implemented.

Figure 5:
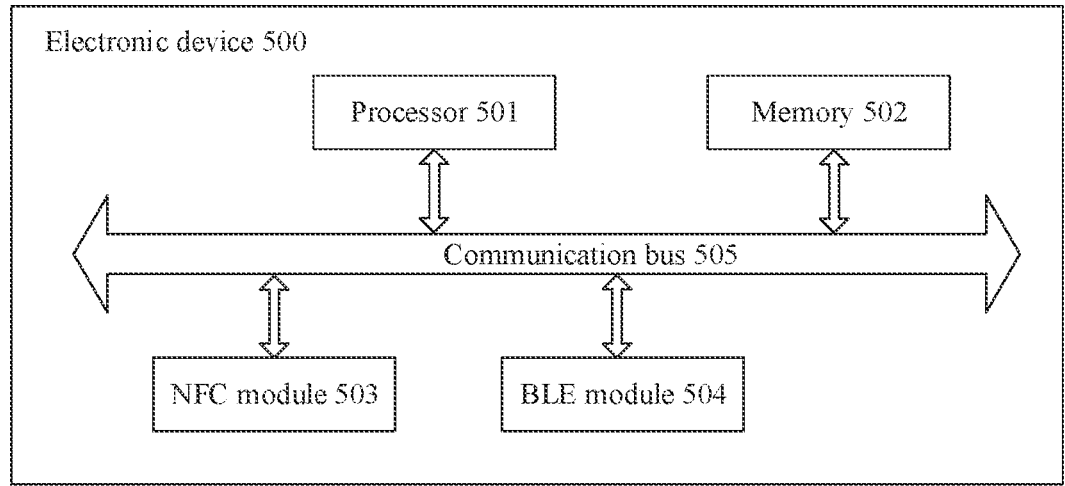
FIG. 5 is a schematic block diagram of an electronic device according to an embodiment of this application.

FIG. 5 is a schematic block diagram of an electronic device according to an embodiment of this application. The electronic device 500 includes a processor 501, a memory 502, an NFC module 503, and a BLE module 504. The memory is configured to store a computer executable instruction. When the electronic device 500 runs, the processor 501 executes the computer executable instruction stored in the memory 502, so that the electronic device 500 performs the method steps on a smartphone side in FIG. 3. The NFC module 503 is configured to read an NFC tag to obtain content on the NFC tag (for example, read an NFC tag on a smart speaker to obtain identification information of the smart speaker). The BLE module 504 is configured to send information through broadcast (for example, send multimedia content synchronization information through broadcast) and establish a Bluetooth connection to an electronic device 2 (for example, the smart speaker), to send a control instruction to the electronic device 2 by using the Bluetooth connection.

In some embodiments, the electronic device 500 further includes a communication bus 505. The processor 501 may be connected to the memory 502, the NFC module 503, and the BLE module 504 by using the communication bus 505, to perform corresponding control on the FC module 503 and the BLE module 504 based on the computer executable instruction stored in the memory 502.

For specific implementations of components/devices of the electronic device 500 in this embodiment of this application, refer to implementations of the foregoing method embodiments shown on a smartphone side in FIG. 3. Details are not described herein.

Figure 6:
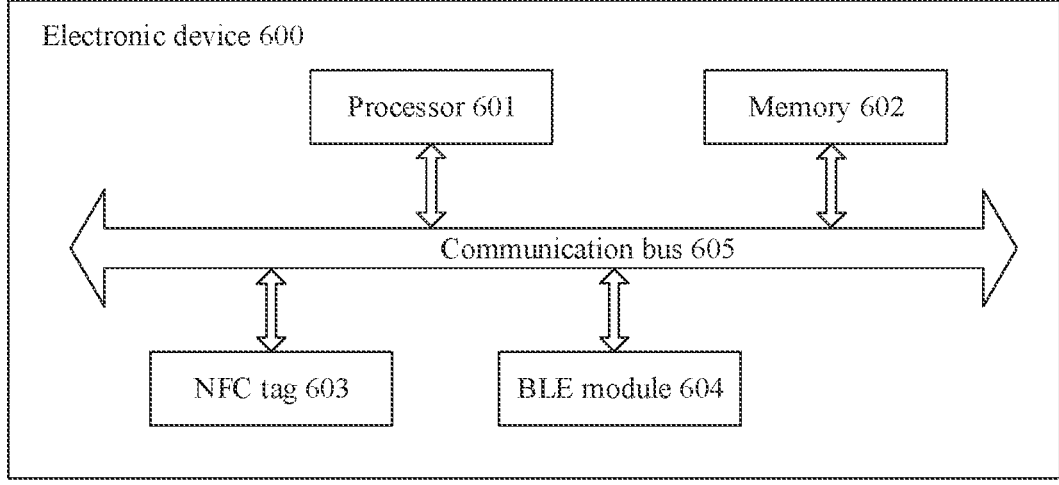
FIG. 6 is a schematic block diagram of an electronic device according to an embodiment of this application.

FIG. 6 is a schematic block diagram of an electronic device according to an embodiment of this application. The electronic device 600 includes a processor 601, a memory 602, an NFC tag 603, and a BLE module 604. The memory is configured to store a computer executable instruction. When the electronic device 600 runs, the processor 601 executes the computer executable instruction stored in the memory 602, so that the electronic device 60) performs the method steps shown on a smart speaker side in FIG. 3. The NFC tag 603 is configured to store identification information of the electronic device and can be detected by the electronic device 600 when being read. The BLE module 604 is configured to establish a BLE connection to an electronic device 1, to receive a control instruction sent by the electronic device.

In some embodiments, the electronic device 600 further includes a communication bus 605. The processor 601 may be connected to the memory 602, the NFC tag 603, and the BLE module 604 by using the communication bus 605, to perform corresponding control on the NFC tag 603 and the BLE module 604 based on the computer executable instruction stored in the memory 602.

For specific implementations of components/devices of the electronic device 600 in this embodiment of this application, refer to implementations of the foregoing method embodiments shown on a smart speaker side in FIG. 3. Details are not described herein.

It may be understood that, the processor in the embodiments of this application may be a central processing unit (central processing unit, CPU), and alternatively, the processor may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any regular processor.

The method steps in the embodiments of this application may be implemented in a hardware manner, or may be implemented in a manner of executing software instructions by the processor. The software instructions may include corresponding software modules. The software modules may be stored in a random access memory (random access memory. RAM), a flash memory, a read-only memory (read-only memory. ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be disposed in an ASIC.

A person of ordinary skill in the art should be aware that units and algorithm steps in the examples described with reference to the embodiments disclosed in this specification can be implemented by electronic hardware, computer software, or a combination of computer software and electronic hardware. To clearly illustrate interchangeability of hardware and software, various illustrative components and steps have been described above generally in terms of functions. Whether these functions are performed in a hardware manner or a software manner depends on a particular application and a design constraint condition of the technical solutions. A person of ordinary skill in the art may use different methods to implement the described functions for each particular application, but it should not be considered that the implementation goes beyond the scope of this application.

The steps of the methods or algorithms described in the embodiments disclosed in this specification may be implemented by hardware and a software module executed by the processor or a combination of hardware and a software module executed by the processor. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementations, the objective, technical solutions, and beneficial effects of this application are further described in detail. It should be understood that the foregoing descriptions are merely specific implementations of this application, but are not intended to limit the protection scope of this application. Any modification, equivalent replacement, or improvement made without departing from the spirit and principle of this application should fall within the protection scope of this application.

What is claimed is:

1. A method comprising:

playing, by a first electronic device, multimedia content;

sending, by the first electronic device, first synchronization information in a broadcast transmission, wherein the first synchronization information comprises a first playback progress, a first playback speed of the multimedia content, and at least a first address, and wherein the first address is an address to obtain the multimedia content;

receiving, by a second electronic device the first synchronization information;

establishing, by the first electronic device in response to a preset operation, a near-field wireless communication connection to the second electronic device;

caching, by the second electronic device in response to the preset operation, the multimedia content based on at least the first address by:

further receiving, by the second electronic device, the first synchronization information at a first time point;

detecting, by the second electronic device, the preset operation at a second time point;

determining, by the second electronic device, an estimated playback progress based on the first playback progress, the first playback speed, the first time point, and the second time point; and further caching, by the second electronic device, the multimedia content based on the estimated playback progress and the first address;

sending, by the first electronic device using the near-field wireless communication connection, a control instruction to the second electronic device; and playing, by the second electronic device, the multimedia content based on the control instruction.

2. The method of claim 1, further comprising:

determining, by the second electronic device, a corrected time period based on a time period required for completing establishing the near-field wireless communication connection or based on data statistics analysis;

determining, by the second electronic device, a corrected second time point based on a sum of the second time point and the corrected time period;

determining, by the second electronic device, a time difference based on a difference between the corrected second time point and the first time point;

determining, by the second electronic device, a corrected playback progress based on a product of the first playback speed and the time difference; and further determining, by the second electronic device, the estimated playback progress based on a sum of the first playback progress and the corrected playback progress, wherein the estimated playback progress is further based on the corrected time period.

3. The method of claim 1, wherein the control instruction comprises second synchronization information, wherein the second synchronization information comprises a second address, a second playback progress, and a second playback speed, wherein the second address, the second playback progress, and the second playback speed are of multimedia content, and wherein the method further comprises:

playing, by the first electronic device, the multimedia content at a third time point, wherein the third time point is a time point at which establishing the near-field wireless communication connection is completed;

comparing, by the second electronic device, the second address, the second playback speed, and the second playback progress with the first address, the first playback speed, the estimated playback progress, and a cache progress to obtain a comparison result, wherein the cache progress is a progress of cashing multimedia content by the second electronic device at the third time point; and caching or playing, by the second electronic device, the multimedia content based on the comparison result.

4. The method of claim 3, wherein caching or playing the multimedia content based on the comparison result comprises:

determining, by the second electronic device, whether the comparison result comprises one or more results including that the first address is different from the second address, the second playback progress is less than the estimated playback progress, or the second playback progress is greater than the cache progress;

caching, by the second electronic device, when the comparison result comprises one or more of the results, the multimedia content based on the second address and the second playback progress; and playing, by the second electronic device, when the comparison result does not comprise any one of the results, the multimedia content based on the second playback progress and the second playback speed.

5. The method of claim 1, wherein the first electronic device comprises a near-field communication (NFC) module, wherein an NFC tag is set on the second electronic device and stores identification information of the second electronic device, the method further comprises:

reading, by the first electronic device, the identification information using the NFC module, wherein the reading is the preset operation;

further establishing, by the first electronic device, the near-field wireless communication connection based on the identification information;

detecting, by the second electronic device, a reading operation; and further caching, by the second electronic device, the multimedia content based on the first address in response to detecting the reading operation.

6. The method of claim 5, wherein the identification information comprises at least one of a media access control (MAC) address of the second electronic device, an Internet Protocol (IP) address of the second electronic device, or an identifier (ID) of the second electronic device.

7. The method of claim 1, wherein sending the first synchronization information in a broadcast transmission comprises:

sending, by the first electronic device, a data packet using a first preset sending periodicity, wherein the data packet comprises the first synchronization information; and sending, by the first electronic device, when the first address or a multimedia content playback parameter changes, the data packet using a second preset sending periodicity within a first preset time period, wherein the second preset sending periodicity is less than the first preset sending periodicity, and wherein the multimedia content playback parameter comprises at least a playback speed.

8. The method of claim 7, wherein the data packet further comprises a hash value of an identifier (ID) of an electronic device that meets a requirement, and wherein the hash value determines whether to parse the data packet when the data packet is received.

9. The method of claim 1, wherein before sending, by the first electronic device, the first synchronization information, the method further comprises:

enabling, by the first electronic device, a near-field discovery function;

enabling, by the second electronic device, a near-field discoverability function; and finding, by the first electronic device, a potential target device, wherein the potential target device is an electronic device that is bound to or has a same account as the first electronic device, an electronic device that has the near-field wireless communication connection to the first electronic device before a first preset time period, or an electronic device that has a preset configuration file.

10. The method of claim 9, wherein enabling the near-field discovery function comprises:

determining, by the first electronic device, whether the first electronic device establishes the near-field wireless communication connection to another electronic device within a second preset time period; and enabling, by the first electronic device, the near-field discovery function when the first electronic device establishes the near-field wireless communication connection to another electronic device within the second preset time period.

11. The method of claim 1, wherein the near-field wireless communication connection is a BLUETOOTH Low Energy (BLE) connection, and wherein establishing, by the first electronic device, the near-field wireless communication connection comprises establishing with the second electronic device, the BLE connection using a first preset BLE connection parameter and a second preset BLE connection parameter, wherein the first preset BLE connection parameter comprises at least one of a preset BLE scanning periodicity or a preset connection scanning duty cycle parameter, and wherein the second preset BLE connection parameter comprises a preset BLE broadcast sending periodicity.

12. A first electronic device comprising:

a memory configured to store instructions; and one or more processors coupled to the memory and configured to execute the instructions to cause the first electronic device to:

play multimedia content;

send first synchronization information in a broadcast transmission to a second electronic device, wherein the first synchronization information comprises at least a first address, and wherein the first address is an address to obtain the multimedia content;

send, through the broadcast transmission, a data packet using a first preset sending periodicity, wherein the data packet comprises the first synchronization information;

send, when the first address or a multimedia content playback parameter changes, the data packet using a second preset sending periodicity within a first preset time period, wherein the second preset sending periodicity is less than the first preset sending periodicity, and wherein the multimedia content playback parameter comprises at least a playback speed;

establish a near-field wireless communication connection to the second electronic device in response to a preset operation to signal the second electronic device to cache the multimedia content based on at least the first address; and send a control instruction to the second electronic device using the near-field wireless communication connection to signal the second electronic device to play the multimedia content based on the control instruction.

13. The first electronic device of claim 12, wherein the data packet further comprises a hash value of an identifier (ID) of an electronic device that meets a requirement, and wherein the hash value determines whether to parse the data packet when the data packet is received.

14. The first electronic device of claim 12, wherein before executing the instructions that cause the first electronic device to send the first synchronization information, the one or more processors, when executing the instructions, further cause the first electronic device to find a potential target device, wherein the potential target device is an electronic device that is bound to or has a same account as the first electronic device, an electronic device that has a near-field wireless communication connection to the first electronic device before a second preset time period, or an electronic device that has a preset configuration file.

15. A second electronic device comprising:

a memory configured to store instructions; and one or more processors coupled to the memory and configured to execute the instructions to cause the second electronic device to:

receive, from a first electronic device, first synchronization information in a broadcast transmission, wherein the first synchronization information comprises a first playback progress, a first playback speed of multimedia content, and at least a first address, and wherein the first address is an address to obtain the multimedia content being played at the first electronic device;

establish a near-field wireless communication connection with the first electronic device in response to a preset operation;

cache, in response to the preset operation, the multimedia content based on at least the first address, wherein, when executed by the one or more processors, the instructions further cause the second electronic device to:

further receive the first synchronization information at a first time point;

detect the preset operation at a second time point;

determine an estimated playback progress based on the first playback progress, the first playback speed, the first time point, and the second time point; and further cache the multimedia content based on the estimated playback progress and the first address;

receive, using the near-field wireless communication connection, a control instruction from the first electronic device; and play the multimedia content based on the control instruction.

16. The second electronic device of claim 15, wherein, when executed by the one or more processors, the instructions further cause the second electronic device to:

determine a corrected time period based on a time period required for completing establishing the near-field wireless communication connection or based on data statistics analysis;

determine a corrected second time point based on a sum of the second time point and the corrected time period;

determine a time difference based on a difference between the corrected second time point and the first time point;

determine a corrected playback progress based on a product of the first playback speed and the time difference; and further determine the estimated playback progress based on a sum of the first playback progress and the corrected playback progress, wherein the estimated playback progress is further based on the corrected time period.

17. The second electronic device of claim 15, wherein the control instruction comprises second synchronization information, wherein the second synchronization information comprises a second address, a second playback progress, and a second playback speed, wherein the second address, the second playback progress, and the second playback speed are respectively an obtaining address, a playback progress, and a playback speed of multimedia content, and wherein, when executed by the one or more processors, the instructions further cause the second electronic device to:

compare the second electronic device, the second address, the second playback speed, and the second playback progress with the first address, the first playback speed, the estimated playback progress, and a cache progress to obtain a comparison result, wherein the cache progress is a progress of cashing multimedia content by the second electronic device at a third time point at which establishing the near-field wireless communication connection is completed; and cache or play the multimedia content based on the comparison result.

18. The second electronic device of claim 17, wherein, when executed by the one or more processors, the instructions further cause the second electronic device to:

determine whether the comparison result comprises one or more results including that the first address is different from the second address, the second playback progress is less than the estimated playback progress, or the second playback progress is greater than the cache progress;

cache, when the comparison result comprises the one or more of the results, the multimedia content based on the second address and the second playback progress; and play, when the comparison result does not comprise any one of the results, the multimedia content based on the second playback progress and the second playback speed.

19. The second electronic device of claim 15, wherein the first electronic device comprises a near-field communication (NFC) module, wherein an NFC tag is set on the second electronic device and stores identification information of the second electronic device, and wherein, when executed by the one or more processors, the instructions further cause the second electronic device to:

detect a reading operation of the first electronic device using the NFC module, wherein the reading operation is the preset operation;

establish with the first electronic device the near-field wireless communication connection based on the identification information; and cache the multimedia content based on the first address in response to detecting the reading operation.

20. The second electronic device of claim 19, wherein the identification information comprises at least one of a media access control (MAC) address of the second electronic device, an Internet protocol (IP) address of the second electronic device, or an identifier (ID) of the second electronic device.

* * * * *